United States Patent
Bahceci et al.

(10) Patent No.: US 11,936,448 B2
(45) Date of Patent: Mar. 19, 2024

(54) PROJECTION MATRIX BASED MU-MIMO PRECODING

(71) Applicant: Telefonaktiebolaget LM Ericsson (publ), Stockholm (SE)

(72) Inventors: Israfil Bahceci, Kanata (CA); Majid Bavand, Ottawa (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 73 days.

(21) Appl. No.: 17/907,843

(22) PCT Filed: Mar. 25, 2020

(86) PCT No.: PCT/IB2020/052822
§ 371 (c)(1),
(2) Date: Aug. 29, 2022

(87) PCT Pub. No.: WO2021/191660
PCT Pub. Date: Sep. 30, 2021

(65) Prior Publication Data
US 2023/0087404 A1   Mar. 23, 2023

(51) Int. Cl.
*H04B 7/0456* (2017.01)
*H04B 7/0452* (2017.01)
*H04B 7/06* (2006.01)

(52) U.S. Cl.
CPC ......... *H04B 7/0456* (2013.01); *H04B 7/0452* (2013.01); *H04B 7/0639* (2013.01)

(58) Field of Classification Search
CPC ... H04B 7/0456; H04B 7/0639; H04B 7/0452
See application file for complete search history.

(56) References Cited

U.S. PATENT DOCUMENTS 9,160,432 B2   10/2015   Park et al.
11,611,379 B2 *   3/2023   Sahraei ............... H04W 72/23
(Continued)

FOREIGN PATENT DOCUMENTS

| CN | 101953088 A | 1/2011 |
| WO | 2009/094797 A1 | 8/2009 |
| WO | 2019/0122972 A1 | 6/2019 |

OTHER PUBLICATIONS

Kolomvakis et al. "A Distortion Nullforming Precoder in Massive MIMO Systems With Nonlinear Hardware", IEEE Wireless Communications Letters, pp. 1775-1779. vol. 11, Issue 9, Sep. 2022 (Year: 2022).*

(Continued)

*Primary Examiner* — Sophia Vlahos
(74) *Attorney, Agent, or Firm* — Christopher & Weisberg, P.A.

(57) ABSTRACT

A network node is configured to receive and/or estimate respective precoder information for a plurality of wireless devices. A respective orthogonal projection matrix is determined for each of the plurality of WDs based at least in part on the precoder information of all other WDs of the plurality of WDs. A respective modified precoder matrix is determined for each of the plurality of WDs based at least in part on the respective orthogonal matrix and precoder information for each WD of the plurality of WDs. A composite precoder matrix is determined based at least in part on the modified precoder matrices for each of the plurality of WDs. A transmission beam shape is then determined for use in transmission to at least one of the plurality of WDs based on the composite precoder matrix.

20 Claims, 5 Drawing Sheets

(56) References Cited

U.S. PATENT DOCUMENTS

| | | | | |
|---|---|---|---|---|
| 2006/0234789 | A1* | 10/2006 | Tarokh | H01Q 1/246 455/575.7 |
| 2007/0155336 | A1 | 7/2007 | Nam et al. | |
| 2007/0183362 | A1* | 8/2007 | Mondal | H04B 7/0617 370/329 |
| 2009/0270118 | A1* | 10/2009 | Jin | H04B 7/0617 375/267 |
| 2014/0036790 | A1* | 2/2014 | Normando | H04B 15/00 370/329 |

OTHER PUBLICATIONS

International Search Report and Written Opinion dated Nov. 11, 2020 issued in PCT Application No. PCT/IB2020/052822, consisting of 11 pages.

* cited by examiner

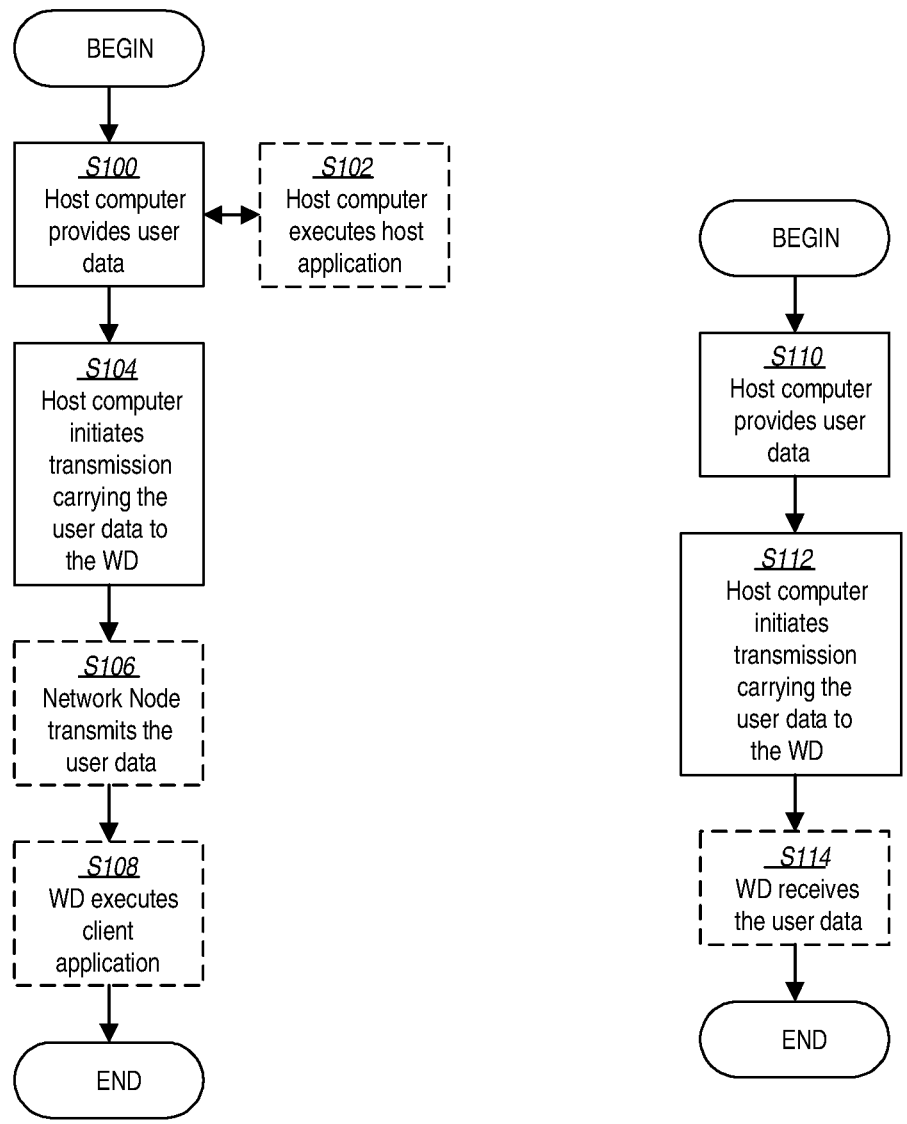

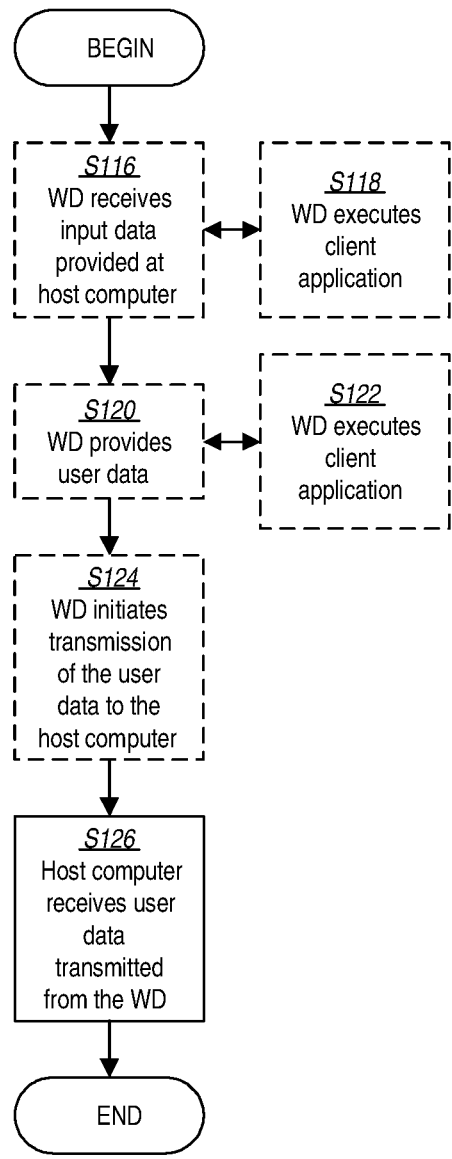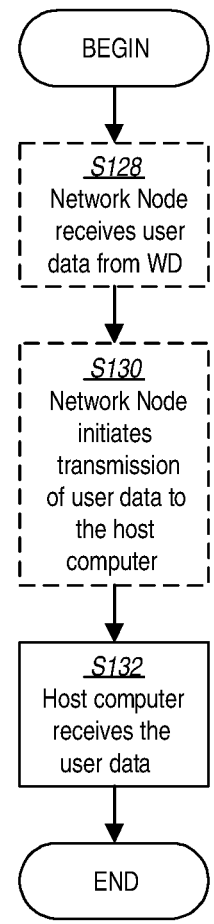
FIG. 5
FIG. 6

PROJECTION MATRIX BASED MU-MIMO PRECODING

CROSS-REFERENCE TO RELATED APPLICATION

This application is a Submission Under 35 U.S.C. § 371 for U.S. National Stage Patent Application of International Application Number: PCT/IB2020/052822, filed Mar. 25, 2020 entitled "PROJECTION MATRIX BASED MU-MIMO PRECODING," the entirety of which is incorporated herein by reference.

TECHNICAL FIELD

Wireless communication and, in particular, network node control of massive multiple-input, multiple-output (MIMO) antenna systems.

BACKGROUND

The introduction of massive multiple-input and multiple-output (MIMO) antenna systems enabled very high transmission capacities over wireless channels. However, the capacity of a wireless link may be determined by a smaller number of antenna elements at the transmitter and receiver. Thus, if only a single user is served at a time, the maximum capacity is limited by the wireless device's (WD) antenna count since it may be assumed that the WD has a smaller number of antenna than the network node. In order to utilize the full capacity of a wireless communication system, many WDs may need to be served on the same resources. This can be achieved by pairing WDs and determining suitable proper precoder matrices for each WD in such a way that they create minimal inter-WD interference while at the same time providing acceptable signal quality at the target WD.

The typical solution to multiple user multiple-input and multiple-output (MU-MIMO) precoding employs Zero-Forcing (ZF) precoders or some variation thereof. These precoders require accurate channel state information at the network node side. However, that information is either cumbersome to obtain due to the need for high overhead, or due to radio frequency (RF) impairments that require accurate channel calibration between downlink (DL) and uplink (UL) channels. In addition, these methods typically require the inversion of large dimensional matrices with the size of the minimum of the number of antenna ports at the network node or the summation of the number of antenna ports at all scheduled WDs.

SUMMARY

In existing approaches, precoder matrix feedback may be well suited to single-user MIMO transmission where the aim is to send information to the WD that provided its desired beam direction with respect to the network node. However, if the network node wishes to serve multiple WDs at once, e.g., perform MU-MIMO transmission, the precoders from the feedback may create interference for other WDs and may render the MU-MIMO transmission useless. In order to benefit MU-MIMO transmission while keeping the complexity and overhead at acceptable levels, methods and systems that can calculate suitable precoders using low-resolution channel state information are needed.

Some embodiments of the present disclosure advantageously employ compressed channel state information in the form of precoder matrix feedback from WDs, and calculate new precoder matrices suitable for MU-MIMO transmission based on the WD precoder matrix feedback. Doing so requires minimal overhead as compared with other solutions, and may mimic the behavior of a zero-forcing like beamformer. Embodiments may rely on codebook based precoding where the required feedback is the precoder matrix calculated at the WD side. In addition, the proposed method and system can perform suitable rank allocation among users based on the potential inter-WD interference indicated by the precoder feedback.

According to one embodiment of the disclosure, a network node is configured to communicate with a wireless device WD. The network node is further configured to at least one of receive and estimate respective precoder information for a plurality of WD. A respective orthogonal projection matrix is determined by the network node for each of the plurality of WDs based at least in part on the precoder information of all other WDs of the plurality of WDs. A respective modified precoder matrix is determined by the network node for each of the plurality of WDs based at least in part on the respective orthogonal matrix and precoder information for each WD of the plurality of WDs. A composite precoder matrix is determined by the network node based at least in part on the modified precoder matrices for each of the plurality of WDs. A transmission beam shape is then determined by the network node for use in transmission to at least one of the plurality of WDs based on the composite precoder matrix.

According to one aspect of this embodiment, the respective precoder information is indicative of a channel state measured by each WD of the plurality of WDs. According to another aspect of this embodiment, the network node is further configured to determine the respective modified precoder matrix for each WD of the plurality of WDs based on the respective precoder information and orthogonal matrix for each WD such that interference between transmissions to at least one WD of the plurality of WDs and transmissions to at least one other WD of the plurality of WDs are minimized. According to another aspect of this embodiment, the network node is further configured to determine the respective modified precoder matrix for each WD of the plurality of WDs such that correlation between the respective modified precoder matrix for each WD and the respective precoder information for each WD is maximized. According to another aspect of this embodiment, the modified precoder matrix for a WD is determined to maximize orthogonality between the modified precoder matrix of the WD and a modified precoder matrix of at least one other WD of the plurality of WDs. According to another aspect of this embodiment, the network node is further configured to create the modified precoder matrix for each of the plurality of WDs using a linear mapping. According to another aspect of this embodiment, the network node is further configured to utilize codebook based precoding that uses the respective precoder information for each WD of the plurality of WDs as feedback. According to another aspect of this embodiment, the network node is further configured to perform a multi-user, multiple-input, multiple output, MU-MIMO, transmission based at least in part on the determined transmission beam shape. According to another aspect of this embodiment, the respective precoder information for each WD is a precoder matrix calculated by the WD and transmitted to the network node. According to another aspect of this embodiment, the composite precoder matrix is based at least in part on a rank indication for each of the WDs of the plurality of WDs.

According to another embodiment of the disclosure, a method implemented in a network node includes at least one of receiving and estimating respective precoder information for a plurality of wireless devices, WDs. In a second step of the method, a respective orthogonal projection matrix is determined for each of the plurality of WDs based at least in part on the precoder information of all other WDs of the plurality of WDs. In a third step of the method, a respective modified precoder matrix is determined for each of the plurality of WDs based at least in part on the respective orthogonal matrix and precoder information for each WD of the plurality of WDs. In a fourth step of the method, a composite precoder matrix is determined based at least in part on the modified precoder matrices for each of the plurality of WDs. In a fifth step of the method, a transmission beam shape for use in transmission to at least one of the plurality of WDs is then determined based on the composite precoder matrix.

According to one aspect of this embodiment, the respective precoder information is indicative of a channel state measured by each WD of the plurality of WDs. According to another aspect of this embodiment, the method further comprises determining the respective modified precoder matrix for each WD of the plurality of WDs based on the respective precoder information and orthogonal matrix for each WD such that interference between transmissions to at least one WD of the plurality of WDs and transmissions to at least one other WD of the plurality of WDs are minimized. According to another aspect of this embodiment, the method further comprises determining the respective modified precoder matrix for each WD of the plurality of WDs such that correlation between the respective modified precoder matrix for each WD and the respective precoder information for each WD is maximized. According to another aspect of this embodiment, the modified precoder matrix for a WD is determined to maximize orthogonality between the modified precoder matrix of the WD and a modified precoder matrix of at least one other WD of the plurality of WDs. According to another aspect of this embodiment, the method further comprises creating the modified precoder matrix for each of the plurality of WDs using a linear mapping. According to another aspect of this embodiment, the method further comprises utilizing codebook based precoding that uses the respective precoder information for each WD of the plurality of WDs as feedback. According to another aspect of this embodiment, the method further comprises performing a multi-user multiple-input multiple output, MU-MIMO, transmission based at least in part on the determined transmission beam shape. According to another aspect of this embodiment, the respective precoder information for each WD is a precoder matrix calculated by the WD and transmitted to the network node. According to another aspect of this embodiment, the composite precoder matrix is based at least in part on a rank indication for each of the WDs of the plurality of WDs.

The described embodiments may allow the network node to carefully adjust the precoder obtained from the WD feedback such that the interference to other WDs in the MU-MIMO set is reduced while the directions of the desired beams are varied only slightly from the unadjusted precoders. Further, the described embodiments require very little overhead, e.g., a precoder index and rank indication as opposed to the large overhead of type II codebook based transmissions. Based on the precoders from multiple users, the network node operates on lower dimensional precoder matrices to obtain modified precoders with desired beam shapes suitable for MU-MIMO transmission. The network node can override ranks of the transmissions for which modified precoders can still maintain interference nulling towards selected directions. The precoders are modified through linear operations, e.g., linear matrix multiplications and inversion, so the modification can be performed within a deterministic time since it does not require any iterative optimization type calculations.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 3 is a flowchart illustrating example methods implemented in a communication system including a host computer, a network node and a wireless device for executing a client application at a wireless device according to some embodiments of the present disclosure;

FIG. 4 is a flowchart illustrating example methods implemented in a communication system including a host computer, a network node and a wireless device for receiving user data at a wireless device according to some embodiments of the present disclosure;

FIG. 5 is a flowchart illustrating example methods implemented in a communication system including a host computer, a network node and a wireless device for receiving user data from the wireless device at a host computer according to some embodiments of the present disclosure;

FIG. 6 is a flowchart illustrating example methods implemented in a communication system including a host computer, a network node and a wireless device for receiving user data at a host computer according to some embodiments of the present disclosure.

DETAILED DESCRIPTION

Figure 1:
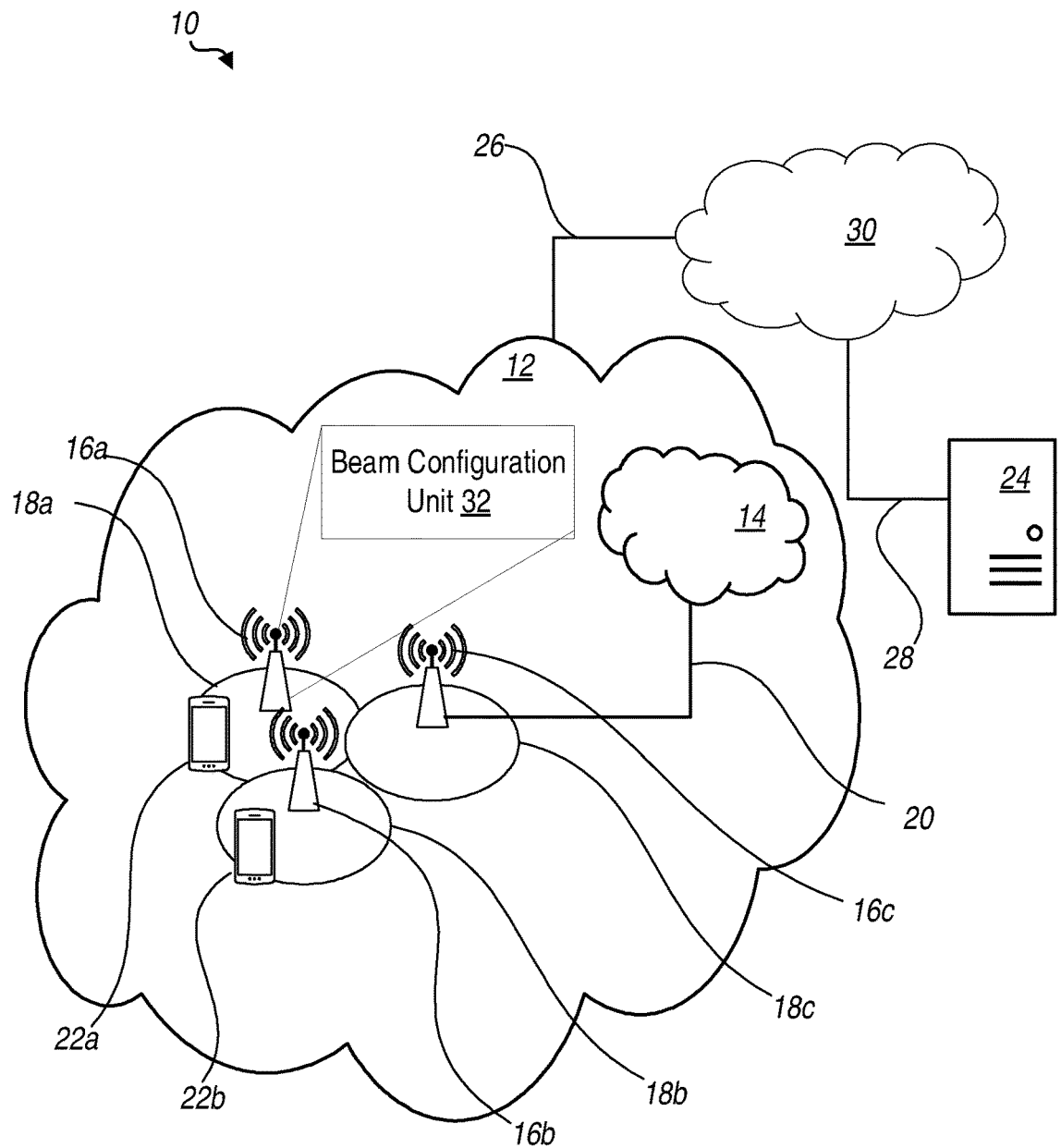
FIG. 1 is a schematic diagram of an example network architecture illustrating a communication system connected via an intermediate network to a host computer according to the principles in the present disclosure.

Before describing in detail example embodiments, it is noted that the embodiments reside primarily in combinations of apparatus components and processing steps related to projection matrix based MU-MIMO precoding to determine appropriate precoder matrices for a transmitting node that create minimal inter-WD interference while providing acceptable signal quality at the target WD. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Note that although terminology from one particular wireless system, such as, for example, 3rd Generation Partnership Project (3GPP) Long Term Evolution (LTE) and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments provide for projection matrix based MU-MIMO precoding to determine appropriate precoder matrices for a transmitting node that create minimal inter-WD interference while providing acceptable signal quality at the target WD. Some embodiments of the present disclosure advantageously employ compressed channel state information in the form of precoder matrix feedback from WDs and calculate new precoder matrices suitable for MU-MIMO transmission based on the WD precoder matrix feedback. Doing so requires minimal overhead and may mimic the behavior of a zero-forcing like beamformer. In addition, the proposed method and system can perform suitable rank allocation among users based on the potential inter-WD interference indicated by the precoder feedback.

Referring now to the drawing figures, in which like elements are referred to by like reference numerals, there is shown in FIG. 1 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16a. A second WD 22b in coverage area 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 1 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

Network node 16 may be configured to include a beam configuration unit 32 which may be configured to perform projection matrix based MU-MIMO precoding to determine appropriate precoder matrices for a transmitting node that create minimal inter-WD interference while providing acceptable signal quality at the target WD. More particularly, the beam configuration unit 32 may receive and/or estimate respective precoder information for a plurality of WDs; determine a respective orthogonal projection matrix for each of the plurality of WDs based at least in part on the precoder information of all other WDs of the plurality of WDs; determine a respective modified precoder matrix for each of the plurality of WDs based at least in part on the respective orthogonal matrix and precoder information for each WD of the plurality of WDs; determine a composite precoder matrix based at least in part on the modified precoder matrices for each of the plurality of WDs; and determine a transmission beam shape for use in transmission to at least one of the plurality of WDs based on the composite precoder matrix.

Example implementations, in accordance with an embodiment, of the WD 22, network node 16 and host computer 24 discussed in the preceding paragraphs will now be described with reference to FIG. 2. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22. Accordingly, the processing circuitry 42 of the host computer 24 may include a dedicated monitoring and control unit 54 configured to enable the service provider to monitor and control the network node 16 and/or the wireless device 22.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10. In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include beam configuration unit 32 configured to perform projection matrix based MU-MIMO precoding to determine appropriate precoder matrices for a transmitting node that create minimal inter-WD interference while providing acceptable signal quality at the target WD.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22.

Figure 2:
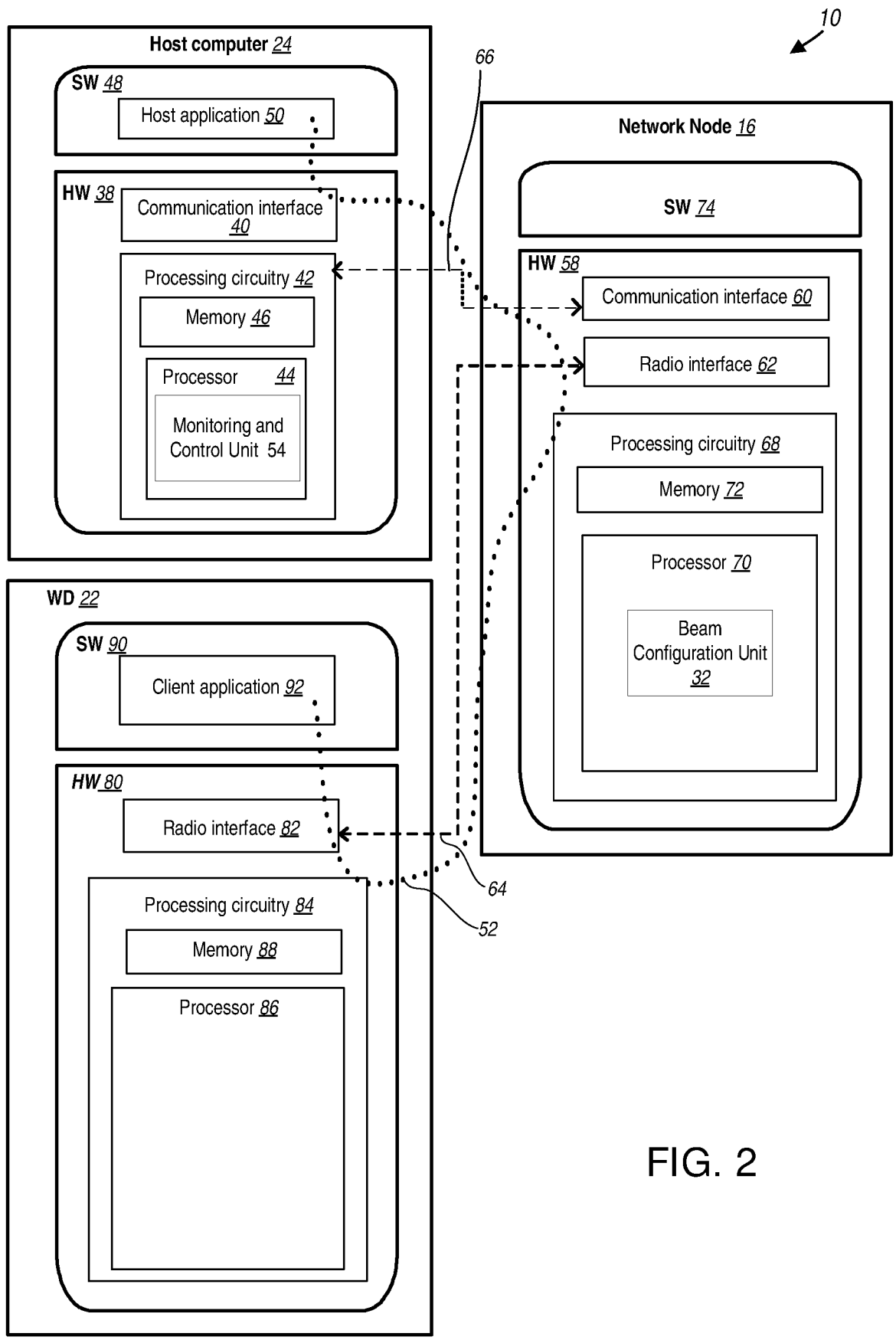
FIG. 2 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 2 and independently, the surrounding network topology may be that of FIG. 1.

In FIG. 2, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc. In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 1 and 2 show various "units", such as beam configuration unit 32, as being within a respective processor, it is contemplated that these units may be implemented such that a portion of the unit is stored in a corresponding memory within the processing circuitry. In other words, the units may be implemented in hardware or in a combination of hardware and software within the processing circuitry.

FIG. 3 is a flowchart illustrating an example method implemented in a communication system, such as, for example, the communication system of FIGS. 1 and 2, in accordance with one embodiment. The communication system may include a host computer 24, a network node 16 and a WD 22, which may be those described with reference to FIG. 2. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 4 is a flowchart illustrating an example method implemented in a communication system, such as, for example, the communication system of FIG. 1, in accordance with one embodiment. The communication system may include a host computer 24, a network node 16 and a WD 22, which may be those described with reference to FIGS. 1 and 2. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

FIG. 5 is a flowchart illustrating an example method implemented in a communication system, such as, for example, the communication system of FIG. 1, in accordance with one embodiment. The communication system may include a host computer 24, a network node 16 and a WD 22, which may be those described with reference to FIGS. 1 and 2. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

FIG. 6 is a flowchart illustrating an example method implemented in a communication system, such as, for example, the communication system of FIG. 1, in accordance with one embodiment. The communication system may include a host computer 24, a network node 16 and a WD 22, which may be those described with reference to FIGS. 1 and 2. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 7:
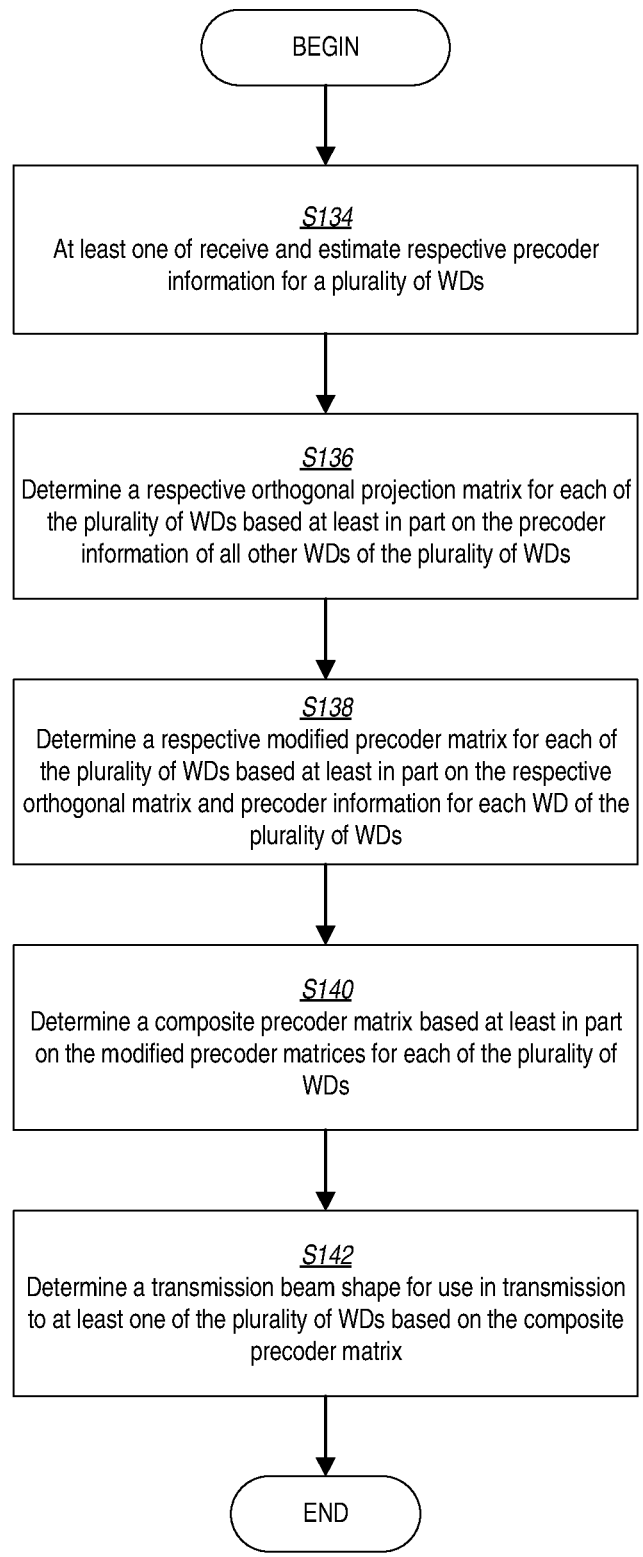
FIG. 7 is a flowchart of an example process in a network node for determining a transmission beam shape for use in transmission to at least one of a plurality of WDs in accordance with some embodiments.

FIG. 7 is a flowchart of an example process in a network node 16 for determining a transmission beam shape for use in transmission to at least one of a plurality of WDs 22 in accordance with some embodiments. One or more Blocks and/or functions performed by network node 16 may be performed by one or more elements of network node 16 such as by beam configuration unit 32 in processing circuitry 68, processor 70, communication interface 60, radio interface 62, etc. Network node 16 such as via one or more of processing circuitry 68, processor 70, radio interface 62 and communication interface 60 is configured to communicate with a WD 22. In one or more embodiments, network node 16 such as via one or more of processing circuitry 68, processor 70, radio interface 62 and communication interface 60 is configured to at least one of receive and estimate (Block S134) respective precoder information for a plurality of WDs 22. A respective orthogonal projection matrix for each of the plurality of WDs 22 is determined (Block S136) based at least in part on the precoder information of all other WDs 22 of the plurality of WDs 22. A respective modified precoder matrix is determined (Block S138) for each of the plurality of WDs 22 based at least in part on the respective orthogonal matrix and precoder information for each WD of the plurality of WDs A composite precoder matrix is determined (Block S140) based at least in part on the modified precoder matrices for each of the plurality of WDs. A transmission beam shape for use in transmission to at least one of the plurality of WDs is determined (Block S142) based on the composite precoder matrix.

In one or more embodiments, the respective precoder information is indicative of a channel state measured by each WD of the plurality of WDs.

In one or more embodiments, network node 16 such as via one or more of processing circuitry 68, processor 70, radio interface 62 and communication interface 60 is further configured to determine the respective modified precoder matrix for each WD of the plurality of WDs based on the respective precoder information and orthogonal matrix for each WD such that interference between transmissions to at least one WD of the plurality of WDs and transmissions to at least one other WD of the plurality of WDs are minimized.

In one or more embodiments, network node 16 such as via one or more of processing circuitry 68, processor 70, radio interface 62 and communication interface 60 is further configured to determine the respective modified precoder matrix for each WD of the plurality of WDs such that correlation between the respective modified precoder matrix for each WD and the respective precoder information for each WD is maximized.

In one or more embodiments, the modified precoder matrix for a WD is determined to maximize orthogonality between the modified precoder matrix of the WD and a modified precoder matrix of at least one other WD of the plurality of WDs.

In one or more embodiments, network node 16 such as via one or more of processing circuitry 68, processor 70, radio interface 62 and communication interface 60 is further configured to create the modified precoder matrix for each of the plurality of WDs using a linear mapping.

In one or more embodiments, network node 16 such as via one or more of processing circuitry 68, processor 70, radio interface 62 and communication interface 60 is further configured to utilize codebook based precoding that uses the respective precoder information for each WD of the plurality of WDs as feedback.

In one or more embodiments, network node 16 such as via one or more of processing circuitry 68, processor 70, radio interface 62 and communication interface 60 is further configured to perform a multi-user, multiple-input, multiple output, MU-MIMO, transmission based at least in part on the determined transmission beam shape.

In one or more embodiments, the respective precoder information for each WD is a precoder matrix calculated by the WD and transmitted to the network node.

In one or more embodiments, the composite precoder matrix is based at least in part on a rank indication for each of the WDs of the plurality of WDs.

Having described the general process flow of arrangements of the disclosure and having provided examples of hardware and software arrangements for implementing the processes and functions of the disclosure, the sections below provide details and examples of arrangements for utilizing projection matrix based MU-MIMO precoding to determine appropriate precoder matrices for a transmitting node that create minimal inter-WD interference while providing appropriate signal quality at the target WD 22.

For example, if a network node 16 with M transmit antennas and U users is provided in which WD-i supports up to $L_i$ layers, i=0, ..., U−1. If the network node's 16 scheduler entity, e.g., as may be provided using processing circuitry 68, choses K WDs, i=$i_0$, ..., $i_{K-1}$ according to a WD scheduling algorithm, only rank constrains, e.g., $\Sigma_{k=0}^{K-1} L_{i_k} = L_T \leq L_{max} \leq M$, are needed to determine a respective modified precoder matrix for each of the WDs 22. Let the WD-i's precoder matrix feedback correspond to an M×$L_{i_k}$ matrix $W_{i_k}$. In order to serve to K WDs in a MU-MIMO transmission, the precoder for each WD 22 can be modified by the network node 16 using a linear mapping, $A_{i_k}(i)$:

$$P_{i_k} = A_{i_k}(i) W_{i_k}$$

The modified precoder $P_{i_k}$ should be as closely correlated with the original precoder matrix $W_{i_k}$ as possible, while also being as orthogonal possible as to $W_{i_j}$, j≠k, j=0, ..., K−1. This presents a similar problem to those encountered when projecting to orthogonal spaces. In an embodiment, the projection of the $W_{i_k}$ column space is determined to a space that is the null-space of all precoders $W_{i_j}$, j=0, ..., K−1, j≠k. This may be achieved via the orthogonal projection matrix $$A_{i_k} = I - Z_{\overline{i_k}} \left( Z_{\overline{i_k}}^H Z_{\overline{i_k}} \right)^{-1} Z_{\overline{i_k}}^H$$

$$Z_{\overline{i_k}} = [W_{i_0} \ ... \ W_{i_{k-1}} W_{i_{k+1}} \ ... \ W_{i_{K-1}}],$$

e.g., composite precoder matrix containing precoders for all users except that for WD-$i_k$. Thus, with $A_{i_k}$ being the orthogonal projection matrix, the resulting precoder will have nulls at the directions defined by the columns of $$Z_{\bar{i_k}}.$$

The MU MIMO transmission may next be performed by the network node 16, such as via one or more of processing circuitry 68, processor 70, radio interface 62 and communication interface 60 using the modified composite precoder matrix of dimension M×$L_T$.

$$P=[P_{i_0}P_{i_1} \ldots P_{i_{K-1}}]$$

In order to improve the performance, the rank of the WD 22 transmission may be updated, such as by the network node 16. This may be needed in case scheduled WDs 22 may not have enough spatial separability in certain directions corresponding to one or more of the layers. To do that, the projection matrix $Z_{\bar{i_k}}$ may be kept the same as above, e.g., maintain all columns of precoders for which we need to reduce interference. Based on the strength of projected precoder's projection on the null-space of other WD's 22 precoders $Z_{\bar{i_k}}$ and/or on range space of desired precoder ($W_{i_k}$), some selected columns of $W_{i_k}$ may be omitted. In such an embodiment, the modified precoder can be expressed as:

$$P_{i_k}A_{i_k}(i)W_{i_k}E_k$$

where $E_k$ is an $L_{i_k} \times L'_{i_k}$ indicator matrix, with 1 at (j,l) with j denoting the selected column for transmission for the new rank l, l=0, ..., $L'_{i_k}$−1.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A network node configured to communicate with a wireless device, WD, the network node configured to:
at least one of receive and estimate respective precoder information for a plurality of WDs;

determine a respective orthogonal projection matrix for each of the plurality of WDs based at least in part on the precoder information of all other WDs of the plurality of WDs;

determine a respective modified precoder matrix for each of the plurality of WDs based at least in part on the respective orthogonal matrix and precoder information for each WD of the plurality of WDs;

determine a composite precoder matrix based at least in part on the modified precoder matrices for each of the plurality of WDs; and determine a transmission beam shape for use in transmission to at least one of the plurality of WDs based on the composite precoder matrix.

2. The network node of claim 1, wherein the respective precoder information is indicative of a channel state measured by each WD of the plurality of WDs.

3. The network node of claim 1, further configured to determine the respective modified precoder matrix for each WD of the plurality of WDs based on the respective precoder information and orthogonal matrix for each WD such that interference between transmissions to at least one WD of the plurality of WDs and transmissions to at least one other WD of the plurality of WDs are minimized.

4. The network node of claim 1, further configured to determine the respective modified precoder matrix for each WD of the plurality of WDs such that correlation between the respective modified precoder matrix for each WD and the respective precoder information for each WD is maximized.

5. The network node of claim 1, wherein the modified precoder matrix for a WD is determined to maximize orthogonality between the modified precoder matrix of the WD and a modified precoder matrix of at least one other WD of the plurality of WDs.

6. The network node of claim 1, further configured to create the modified precoder matrix for each of the plurality of WDs using a linear mapping.

7. The network node of claim 1, further configured to utilize codebook based precoding that uses the respective precoder information for each WD of the plurality of WDs as feedback.

8. The network node of claim 1, further configured to perform a multi-user, multiple-input, multiple output, MU-MIMO, transmission based at least in part on the determined transmission beam shape.

9. The network node of claim 1, wherein the respective precoder information for each WD is a precoder matrix calculated by the WD and transmitted to the network node.

10. The network node of claim 1 wherein the composite precoder matrix is based at least in part on a rank indication for each of the WDs of the plurality of WDs.

11. A method implemented in a network node, the method comprising:

at least one of receiving and estimating respective precoder information for a plurality of wireless devices, WDs;

determining a respective orthogonal projection matrix for each of the plurality of WDs based at least in part on the precoder information of all other WDs of the plurality of WDs;

determining a respective modified precoder matrix for each of the plurality of WDs based at least in part on the respective orthogonal matrix and precoder information for each WD of the plurality of WDs;

determining a composite precoder matrix based at least in part on the modified precoder matrices for each of the plurality of WDs; and determining a transmission beam shape for use in transmission to at least one of the plurality of WDs based on the composite precoder matrix.

12. The method of claim 11, wherein the respective precoder information is indicative of a channel state measured by each WD of the plurality of WDs.

13. The method of claim 11, further comprising determining the respective modified precoder matrix for each WD of the plurality of WDs based on the respective precoder information and orthogonal matrix for each WD such that interference between transmissions to at least one WD of the plurality of WDs and transmissions to at least one other WD of the plurality of WDs are minimized.

14. The method of claim 11, further comprising determining the respective modified precoder matrix for each WD of the plurality of WDs such that correlation between the respective modified precoder matrix for each WD and the respective precoder information for each WD is maximized.

15. The method of claim 11, wherein the modified precoder matrix for a WD is determined to maximize orthogonality between the modified precoder matrix of the WD and a modified precoder matrix of at least one other WD of the plurality of WDs.

16. The method of claim 11, further comprising creating the modified precoder matrix for each of the plurality of WDs using a linear mapping.

17. The method of claim 11, further comprising utilizing codebook based precoding that uses the respective precoder information for each WD of the plurality of WDs as feedback.

18. The method of claim 11, further comprising performing a multi-user multiple-input multiple output, MU-MIMO, transmission based at least in part on the determined transmission beam shape.

19. The method of claim 11, wherein the respective precoder information for each WD is a precoder matrix calculated by the WD and transmitted to the network node.

20. The method of claim 11, wherein the composite precoder matrix is based at least in part on a rank indication for each of the WDs of the plurality of WDs.

* * * * *